(No Model.)
R. J. LEITZEL & H. FROCK.
GATE.
No. 320,805. Patented June 23, 1885.
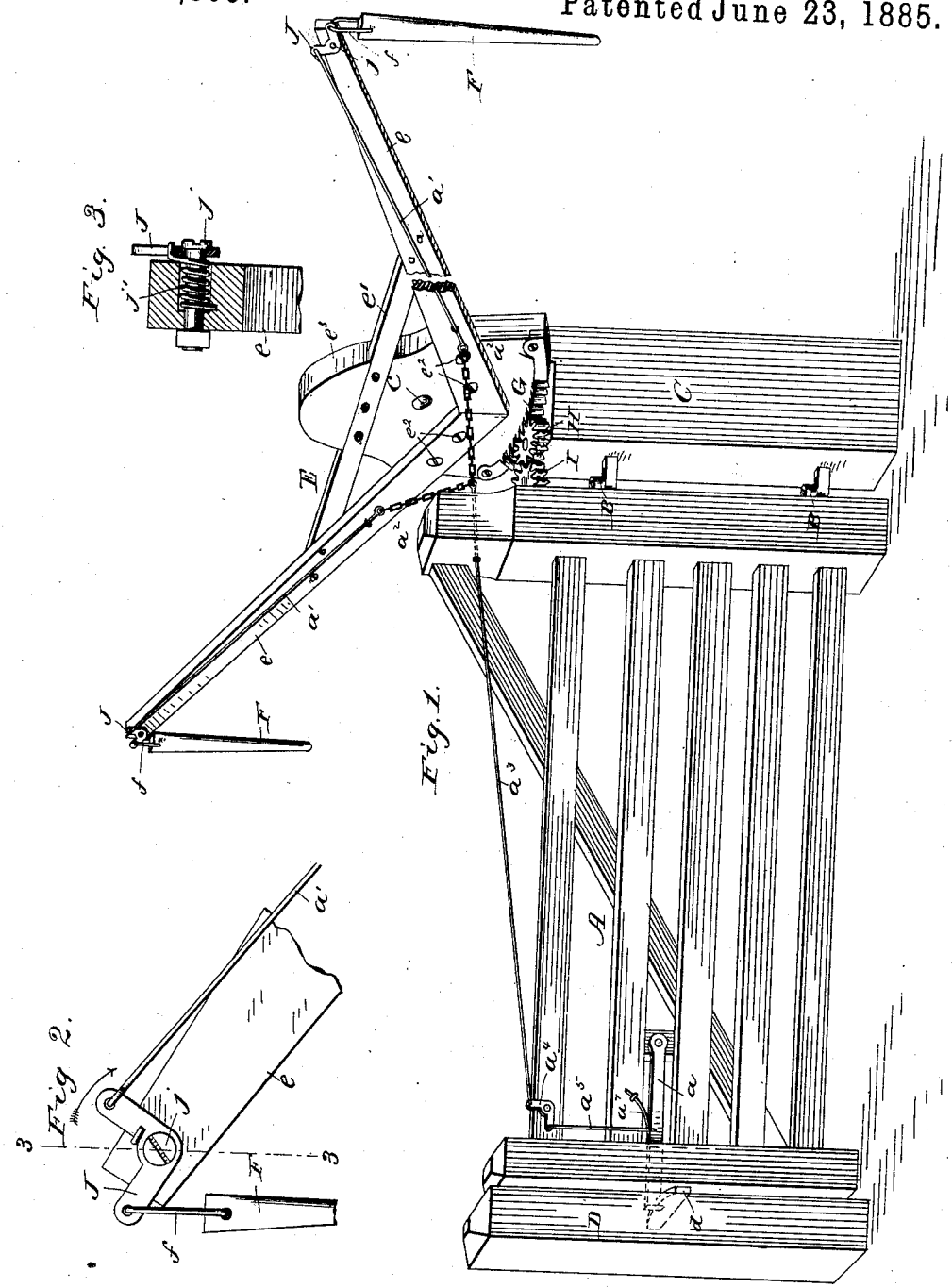

UNITED STATES PATENT OFFICE.

ROSWELL J. LEITZEL AND HENRY FROCK, OF KRATZERVILLE, PENNSYLVANIA; SAID FROCK ASSIGNOR TO SAID LEITZEL.

GATE.

SPECIFICATION forming part of Letters Patent No. 320,805, dated June 23, 1885.

Application filed November 22, 1884. (No model.)

*To all whom it may concern:*

Be it known that we, ROSWELL J. LEITZEL and HENRY FROCK, citizens of the United States, residing at Kratzerville, in the county of Snyder and State of Pennsylvania, have invented certain new and useful Improvements in Gates, of which the following is a specification, reference being had therein to the accompanying drawings.

Our invention relates to that class of swinging gates adapted to be opened by the person approaching them without dismounting from the horse or vehicle which such person may be riding, the object of our invention being the production of a simple and effective mechanism whereby such gates may be easily opened and caused to swing away from the operator or person opening them.

In the accompanying drawings, forming part of this specification, Figure 1 is a perspective view of a gate embodying our invention. Figs. 2 and 3 are detail views illustrating the construction of a portion of the latch-operating mechanism.

A indicates a gate, and B the hinges by which it is attached to the gate-post C.

D is a post, having an ordinary catch, $d$, for the latch $a$ of the gate.

Pivoted at $c$ to the post C is an operating-lever, E, consisting of the outwardly-extending arms $e$, a central block, $e^3$, to which said arms are secured by bolts or screws, as $e^2$, and a strengthening cross-piece, $e'$, attached to said block and arms. These connected parts, constituting the operating-lever E, are thus adapted to move or turn together on the pivot-pin $c$, which passes through the block $e^3$ into the post C.

F F are pendent handles, which are loosely or yieldingly connected to the outer ends of the arms $e$ by means of angular or bell-crank levers J J, attached by pivot-pins $j\ j$ to said arms, said handles being attached to said levers J by links or loops $f$.

Surrounding each of the pivot-pins $j$ is a torsional spring, $j'$, attached at one end to the arm $e$ of the lever E, and having its other end connected to the lever J in such a manner as to have a tendency to turn said lever a limited distance on its pivot-pin in the direction indicated by the arrow in Fig. 2, thus raising the outer or horizontal arm of said lever and the handle F attached thereto.

To the central block, $e^3$, of the lever E is attached a curved rack, G, gearing with a pinion, H, turning on a vertical pivot secured to the post C, said pinion engaging a gear or toothed sector, I, rigidly attached to the gate A.

The levers J are connected by links or rods $a'$ with chains $a^2$, attached to a link or rod, $a^3$, on the gate A, the latter link or rod being connected with an angular lever, $a^4$, which is in turn connected by a link, $a^5$, with the latch $a$, the gravitating action of the said latch being preferably assisted by a spring, $a^7$.

The operation of our gate is as follows: When the gate is closed, a person approaching seizes one of the handles F and pulls down thereon. The first downward movement of the said handle turns the lever J, to which the handle is attached, in opposition to the action of its spring $j'$, and thus through the link or rod $a'$, chain $a^2$, link or rod $a^3$, lever $a^4$, and link $a^5$ the latch $a$ is raised from the catch $d$, leaving the gate free to swing. The continued downward movement of the handle F will next cause the lever E to turn on its pivot, (the resistance of the torsional spring $j'$ being in the meantime increased by compression, or positive stops for the levers J may be provided,) causing the curved rack G to act through the pinion H and toothed sector I on the gate A, swinging the latter open on its hinges away from the operator.

Having thus described our invention, we claim and desire to secure by Letters Patent—

1. The combination, with a swinging gate having a toothed sector or gear, of an operating-lever having a curved rack, a pinion meshing with said rack and sector or gear, pendent handles, spring-retracted bell-crank levers, by which said handles are attached to the outer ends of the arms of said operating-lever, a latch and connections between the latter and the said bell-crank levers, whereby said latch will be lifted during the first part of the downward movement of the handles before the operating-lever is moved, and the gate, when opened, will be swung away from the operator, substantially as set forth.

2. The combination, with the gate A, of the operating-lever E, handles F, curved rack G, pinion H, gear or sector I, levers J, springs $j'$, links or rods $a'$, chains $a^2$, link or rod $a^3$, lever $a^4$, link $a^5$, and latch $a$, substantially as set forth.

3. The combination, with the swinging gate A, having the latch $a$ and the gear or sector I, of the lever E, pendent handles F, levers J, lifting-springs $j$, the lever $a^4$, connected with the latch, and connections between the said levers J and the lever $a^4$, all substantially as shown and described.

In testimony whereof we affix our signatures in presence of two witnesses.

ROSWELL J. LEITZEL.
HENRY FROCK.

Witnesses:
J. B. WUNDERLY,
C. C. SEEBOLD.